United States Patent [19]

Kao

[11] Patent Number: 4,554,576
[45] Date of Patent: Nov. 19, 1985

[54] AUTO FLESH CIRCUITRY AS FOR A DIGITAL TV RECEIVER

[75] Inventor: Yih-Sien Kao, Gaithersburg, Md.

[73] Assignee: RCA Corporation, Princeton, N.J.

[21] Appl. No.: 487,084

[22] Filed: Apr. 21, 1983

[51] Int. Cl.[4] .................................. H04N 9/535
[52] U.S. Cl. .................................. 358/28
[58] Field of Search ........................ 358/28

[56] References Cited

U.S. PATENT DOCUMENTS

| | | | |
|---|---|---|---|
| 3,536,827 | 11/1967 | Bell. | |
| 3,617,621 | 11/1971 | Cochran. | |
| 3,649,748 | 5/1972 | Knauer. | |
| 3,663,744 | 5/1972 | Harwood. | |
| 3,852,807 | 12/1974 | Caprio et al. | 358/28 |
| 3,873,760 | 4/1975 | Worden | 358/21 |
| 3,996,608 | 12/1976 | Harwood | 358/28 |
| 4,001,879 | 1/1977 | Nagaoka et al. | 358/28 |
| 4,084,178 | 4/1978 | Srivastava et al. | 358/28 |
| 4,412,181 | 10/1983 | Marguinaud et al. | 329/50 |

FOREIGN PATENT DOCUMENTS 0071506 7/1982 European Pat. Off..

OTHER PUBLICATIONS

Harwood et al. "Chroma Circuit Design for the CTC-49" RCA Engineer, vol. 15, No. 5, Feb./Mar. 1971, pp. 15-19.

"Digivision" Development Data, Aug. 1982, ITT Intermetall Semiconductors, Freiburg, Germany.

Primary Examiner—Richard Murray
Attorney, Agent, or Firm—E. M. Whitacre; P. J. Rasmussen; E. P. Herrmann

[57] ABSTRACT

A digital TV receiver includes circuitry for performing hue control by rotation of the axes of the I and Q color mixture signals. The I and Q color mixture signals are time division multiplexed and applied to a multiplicand input port of a multiplier circuit. The sines and cosines of the angle by which the I and Q vectors are to be rotated are also applied to the multiplier wherein alternate pairs of the I and Q signals are multiplied by the sine terms and intervening pairs of the I and Q signals are multiplied by cosine terms. The signal from the multiplier is applied to a delay element which delays successive samples by one sample period. Delayed and nondelayed signal samples are applied to an ADDER which produces the algebraic sums $I\cos\phi + Q\sin\phi$ and $Q\cos\phi - I\sin\phi$ corresponding to the desired modified I and Q signals respectively. The sums from the ADDER are demultiplexed by latches to generate separate I and Q signals.

14 Claims, 7 Drawing Figures

$I_c = I_a \cos \theta + Q_a \sin \theta$ $Q_c = Q_a \cos \theta - I_a \sin \theta$

AUTO FLESH CIRCUITRY AS FOR A DIGITAL TV RECEIVER This invention relates to hue control in a TV receiver and more particularly to digital circuitry for cross coupling PCM color mixture signals in a digital TV receiver to rotate the axis of the color mixture signals determining hue.

Color correction, in analog TV receivers, by the process of cross coupling color mixture signals has been described in U.S. Pat. No. 3,536,827, by N. W. Bell and in U.S. Pat. No. 3,873,760, by R. F. Worden. In the Bell patent a "corrected" (R-Y) color mixture signal is produced by generating a signal (B-Y) tan Δ (1−2x) and adding it to the received (R-Y) color mixture signal where (B-Y) is the received color mixture signal in quadrature with the received (R-Y) signal, Δ represents an angular hue error and x is a scalar variable from zero to one. Similarly a "corrected" (B-Y) color mixture signal is produced by generating the signal (R-Y) tan Δ (2x−1) and adding it to the received (B-Y) signal.

In the Worden patent predetermined portions of each of three color mixture signals ((R-Y), (B-Y), (G-Y)) are added to generate two "corrected" color mixture signals ((B-Y)', (G-Y)'). The "corrected" two color mixture signals and the unmodified third color mixture signal, (R-Y), are then applied to suitable matrixing means for combination with a luminance signal to generate corrected red, R, blue, B, and green, G, signals for driving the kinescope display.

The foregoing systems while tending to correct for hue errors are imprecise and are not economical to replicate in digital circuitry. In digital TV receivers currently being developed, all of the video signal processing is to be performed on a limited number (e.g., 5) of very large scale integrated circuits. Analog signal from conventional IF circuits is converted to pulse code modulated (PCM or binary) format by an analog-to-digital-converter. The PCM signal is then processed to separate the luminance and chrominance signal components which are then individually filtered and processed to provide normal signal enhancements. The chrominance signal. is nominally demodulated to its quadrature color mixture signal components, either (R-Y), and (B-Y) or I and Q signals for chrominance signal processing. The color mixture signals are ultimately matrixed with the luminance signal to generate red, green and blue color signals which are converted to analog form for driving the display kinescope. See for example, E. J. Lerner "Digital TV: makers bet on VLSI", IEEE Spectrum, February 1983, p. 39-43.

Because digital analogs of analog functions generally require many more devices to perform the same function, it is imperative that the digital implementation be parts count efficient if all of the requisite processing functions are to be realized on a limited number of integrated circuits. To exemplify the digital-analog circuit parts differences, an analog signal adder may be realized with three resistors while a digital adder (for 8 bit PCM signals) may require several hundred transistors. Even more dramatic is the difference in complexity of analog and digital amplifiers. An analog multiplier can typically be built with less than a dozen transistors while a comparable digital amplifier may require over one thousand transistors.

SUMMARY OF THE INVENTION

The present invention comprises circuitry for digitally performing hue control by cross coupling components of quadrature related color mixture signals. The system is designed to modify hue without affecting the level of color saturation with a minimum of circuit elements.

Hue correction is accomplished by multiplying both of the color mixture signals e.g. I and Q, by the sine and cosine of the angle $\phi$ by which the chrominance vector is to be rotated. A corrected I color mixture signal $I_c$ is generated by summing the products $I\cos\phi$ and $Q\sin\phi$. A corrected Q color mixture signal $Q_c$ is generated by summing the products $Q\cos\phi$ and $(-)I\sin\phi$. The sine and cosine functions are obtained from a look-up memory responsive to address codes provided by a manual hue control element. The sine and cosine functions are multiplexed to one input of a single multiplier circuit. The received I and Q signals are multiplexed as multiplicands to a second input of the multiplier circuit. The $I\sin\phi$, $I\cos\phi$, $Q\sin\phi$ and $Q\cos\phi$ products produced by the multiplier are demultiplexed and applied to two adder circuits which generate the signals $$I_c = I\cos\phi + Q\sin\phi$$

$$Q_c = Q\cos\phi - I\sin\phi$$

Auto flesh is incorporated into the system by monitoring the ratio I/Q to determine when the current hue is within the range of flesh tones. Address codes corresponding to particular angles equal to the arctan I/Q are generated by the auto flesh circuit and combined with the manually generated hue control address codes applied to the sine/cosine memory to instantaneously rotate the vector sum of the I and Q signals toward the flesh tone axis whenever the hue is currently within the range of flesh tone.

Flesh tones are detected by multiplying (bit shift left) the Q signal by a binary constant, N, and subtracting the product from the current I signal. The polarity of the difference indicates whether the angle of the vector sum of I and Q is greater or lesser than arctan N. The detected range of the current vector sum is quantized by employing differing values of N.

DETAILED DESCRIPTION OF THE INVENTION

Color information in a video signal is transmitted via quadrature related color mixture signals I and Q or (R-Y) and (B-Y). These signals are linearly summed to form a single chrominance signal C which is the vector sum of the color mixture signals.

The chrominance signal is phase related to a reference signal (burst) which is transmitted in the composite video signal to facilitate recovery of the color signals. However it frequently happens that the chrominance signal-burst phase relationship is distorted at the receiver resulting in improper color rendition of the transmitted image. Thus some means is necessary to correct the color (hue or tint) in the receiver.

In addition it has been found to be desirable to enhance color signals which fall within the range of colors considered to be flesh tones. Nominal flesh tones are represented by chrominance (C) vectors approaching the I color mixture signal axis. To enhance flesh tones the chrominance vector is rotated toward the I color mixture signal axis when the chrominance vector is determined to be in the range of signals designated for flesh tones.

Figure 1:
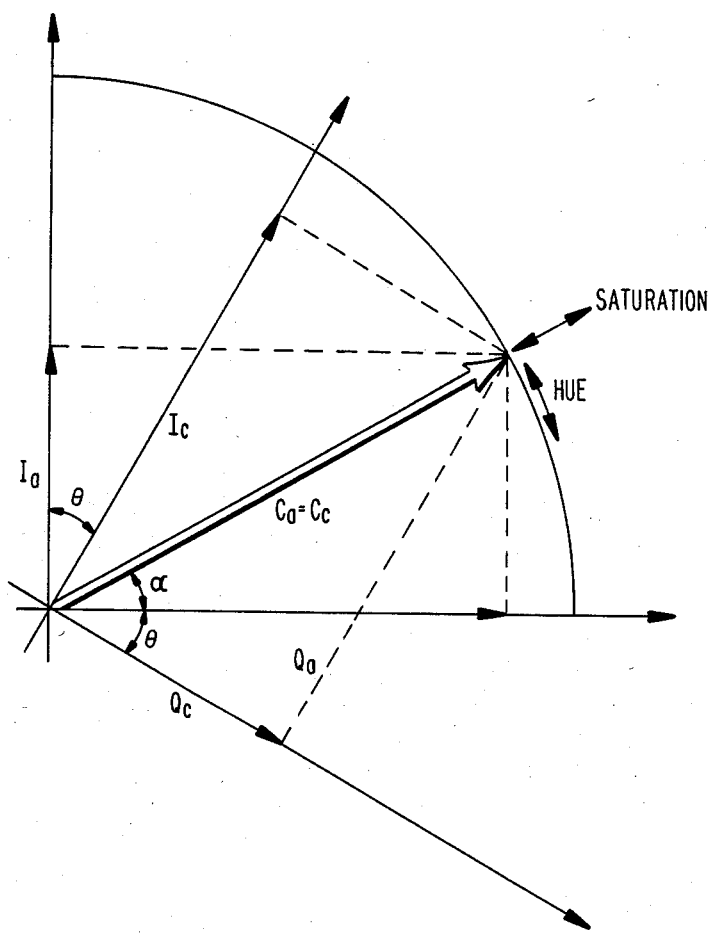
FIG. 1 is a vector diagram of the relationship of quadrature related signals and the vector components associated with rotating the quadrature axes.

Referring to FIG. 1 consider the color mixture signals recovered in the receiver to be $I_a$ and $Q_a$. The quadrature signals I and Q were chosen for illustrative purposes and it should be appreciated that any quadrature color signals could have been chosen such as the (R-Y), (B-Y) color mixture signals or more generally signals A and A2. The vector sum of signals $I_a$ and $Q_a$ is the recovered chrominance signal $C_a$. Assume that for the purpose of either correcting a burst-chrominance phase distortion or for performing automatic flesh tone correction, vector $C_a$ should be rotated $\Phi$ degrees to the position of vector $C_c$. This may be accomplished by rotating the axes of the $I_a$ and $Q_a$ recovered color mixture signals to the positions of the vectors $I_c$ and $Q_c$ respectively. (Note the I and Q axes are rotated because these signals are available in the receiver and it is convenient to operate on these signals.)

Starting with the assumption that the magnitude of the rotated vector $C_c$ must equal the magnitude of the recovered vector $C_a$, from general trigonometric relationships $$I_a = C_a \sin\alpha \tag{1}$$

$$Q_a = C_a \cos\alpha \tag{2}$$

$$I_c = C_c \sin(\alpha + \phi) \tag{3}$$

and $$Q_c = C_c \cos(\alpha + \phi) \tag{4}$$

where $\alpha$ the angle between vectors $C_a$ and $Q_a$. Since $C_a = C_c$ $$I_c = I_a/\sin\alpha(\sin(\alpha + \phi)) \tag{5}$$

$$Q_c = Q_a/\cos\alpha(\cos(\alpha + \phi)) \tag{6}$$

expanding (5)

$$I_c = I_a/\sin\alpha(\sin\alpha\cos\phi + \cos\alpha\sin\phi) \tag{7}$$
$$= I_a\cos\phi + I_a\cot\alpha\sin\phi \tag{8}$$

but $\cot\alpha = Q_a/I_a$
so that $$I_c = I_a\cos\phi + Q_a\sin\phi \tag{9}$$

similarly $$Q_c = Q_a\cos\phi - I_a\sin\phi \tag{100}$$

Thus to rotate the vector sum $C_a$ by $\phi$ degrees, the recovered I and Q vectors are multiplied by the sine and cosine of the angle $\phi$ and the products are summed according to equations (9) and (10) to generate corrected color mixture signals $I_c$ and $Q_c$.

Figure 2:
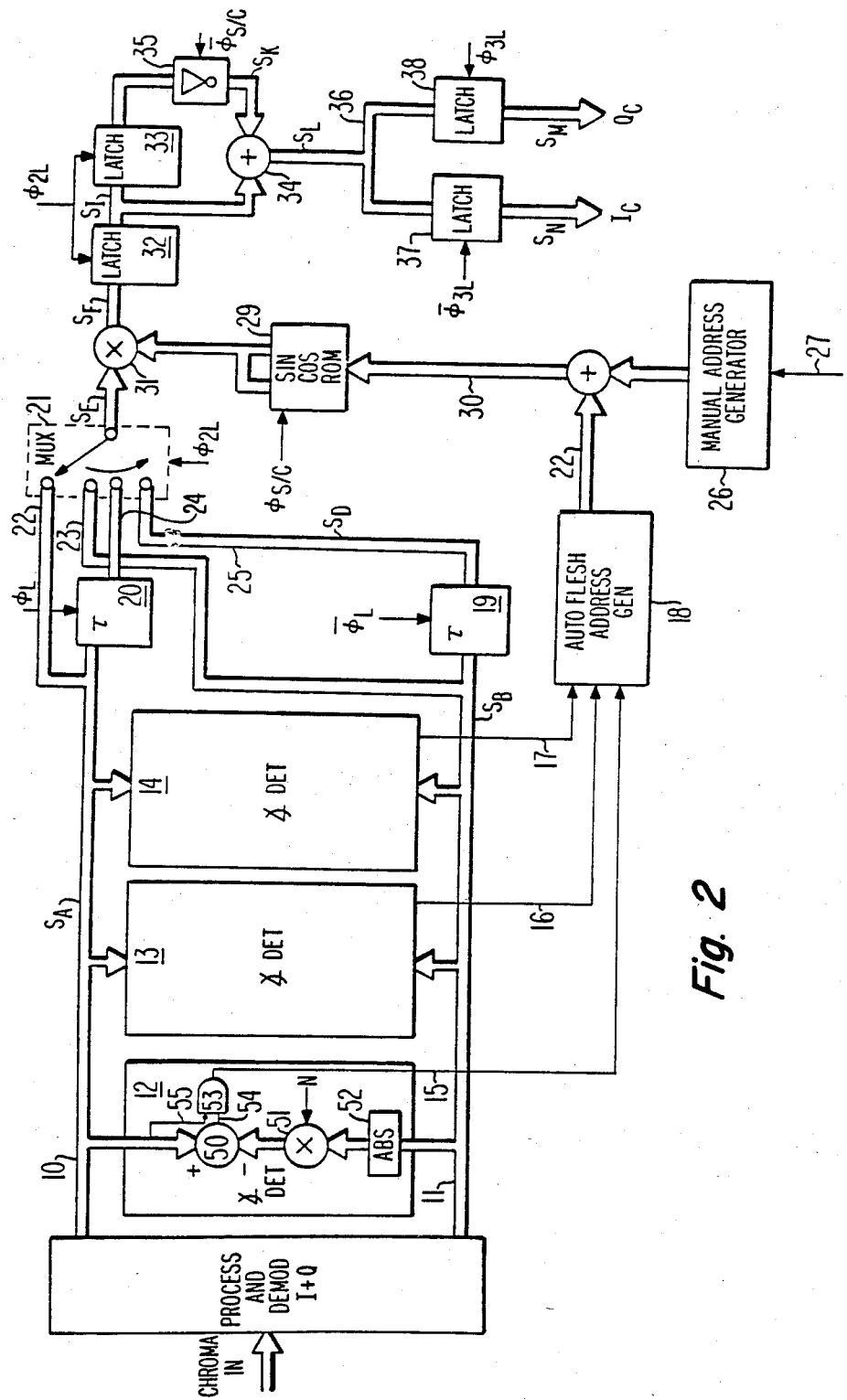
FIGS. 2, 4 and 6 are block diagrams of a portion of a digital TV receiver showing apparatus for performing automatic tint correction embodying the present invention.
Figure 3:
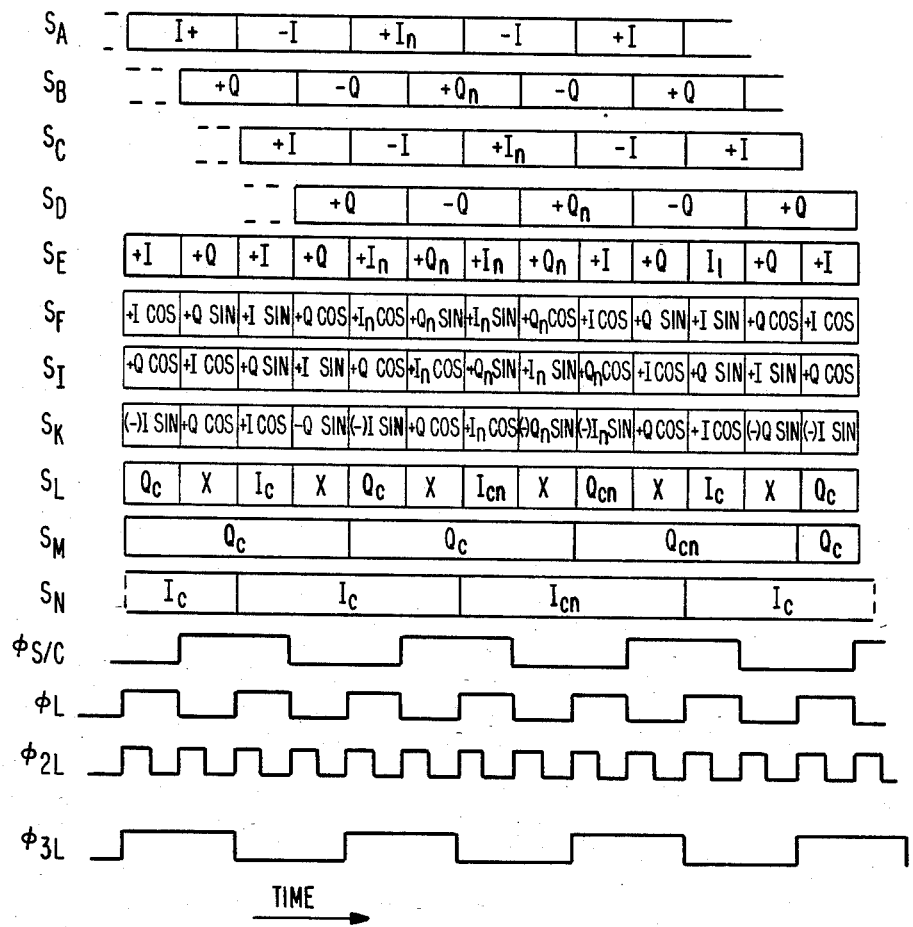
FIGS. 3, 5 and 7 are timing charts illustrating signal sequences and control waveforms for the FIG. 2, 4 and 6 apparatus respectively.

FIG. 2 illustrates circuitry to perform rotation of the color mixture signals I and Q for accomplishing tint correction. The FIG. 2 circuitry is located in the color signal processing channel of the receiver after chrominance has been extracted from composite video and the chrominance signal has been demodulated into its I and Q color mixture signal components. It will be assumed for purposes of description that the I and Q signals are in sampled data pulse code modulated (binary PCM) format. Further it will be presumed that composite video was sampled at four times the color subcarrier rate resulting in the I and Q signals samples each occurring at a two times subcarrier rate and displaced by 90 degrees. The signal sample occurrence is depicted in FIG. 3 and denoted $S_A$ and $S_B$. The I signal samples are shown to alternate between +I and −I samples however the + and − signs are not meant to connate signal polarity but rather the phase of the sampling points relative to burst.

The recovered and demodulated color mixture signal $S_A$ (e.g. parallel 8-bit PCM samples) is applied to signal bus 10, and the recovered and demodulated color mixture signal $S_B$ is applied to signal bus 11. Signals $S_A$ and $S_B$ (i.e. $I_a$ and $Q_a$ respectively) are applied to angle detectors 12, 13 and 14 which respectively generate control signals on output control connections 15, 16 and 17 when the tangent $I_a/Q_a$ exceeds predetermined angles, indicative of the angle of the vector sum $C_a$ relative to $Q_a$ or $I_a$. Signal $S_A$ is also applied to a first input terminal 22 of a multiplexer 21, and to a one sample period delay element 20. Signal $S_B$ is applied to a second input terminal 23 of multiplexer 21 and to a second one sample period delay element 19. Signal $S_C$ (FIG. 3) from delay element 20 and signals $S_D$ from delay element 19 are respectively applied to third and fourth input terminals 24 and 25 of multiplexer 21. Multiplexer 21 clocked by signal $\phi_{2L}$ time division multiplexes the signals $S_A$, $S_B$, $S_C$ and $S_D$ to form the sample sequence $S_E$ which includes alternate samples of the +I and +Q samples. The I and Q signal bandwidths are both less than one half the subcarrier frequency, but since the sample rate of each signal is twice the subcarrier rate the −I and −Q samples may be discarded without loss of information or violation of the Nyquist sampling criterion.

Signal $S_E$ is applied as multiplicand to a multiplier 31. The signals, from circuit element 29, corresponding to the sine and cosine of the angle by which the vectors are to be rotated are applied as multipliers to multiplier 31. Element 29 is a read only memory, ROM, which is clocked by signal $\phi_{S/C}$ to alternately produce the sine and cosine of angles corresponding to ROM address codes applied to ROM address input port 30. Element 29 may be a single ROM programmed to produce the sine of the address code applied when $\phi_{S/C}$ is in the logic high state, and programmed to produce the sine of 90 degrees minus the applied address code (equal to cosine of the address) when $\phi_{S/C}$ is in the logic low state. Alternatively element 29 may be a pair of parallel ROM's one of which is programmed to produce the sine of the applied address code, and the other being programmed to produce the cosine of the applied address code. Responsive to signal $\phi_{s/c}$ the pair of ROM's are alternately energized to apply multiplier signals to the multiplier 31.

Signal $\phi_{s/c}$ is timed to produce the sine of the address code for two of the signal $S_E$ sample periods and then the cosine of the same address code for two sample periods so that the sample sequence $S_F$, available at the multiplier 31 output connection is of the form Qsin$\phi$, Isin$\phi$, Qcos$\phi$, Icos$\phi$, Qsin$\phi$, Isin$\phi$ etc. The signal $S_F$ from multiplier 31 is applied to a latch 32 from which the signal $S_I$ is available. Latch 32 is incorporated in the signal path so that the signal samples are stable over the sample period. Signal $S_I$ from latch 32 is applied to a second latch 33 which delays the samples by one sample period. Signal from latch 33 is applied to a clocked two's complementing circuit 35 which inverts the polarity of the samples when the signal $\phi_{s/c}$ is a logic low. The sequence of samples $S_K$ from circuit 35 therefore has all sine terms inverted in polarity.

The output sequence from complementing circuit 35 and the signal sequence from latch 32 are applied to first and second input ports of ADDER 34. The one sample delay imposed on the signal $S_I$ from latch 32 by the latch 33 temporally aligns, at the adder input ports, samples which are displaced by one sample period. The consecutive pairs of samples occurring at the inputs of adder 34 are +Qcos$\phi$,(−)Isin$\phi$; +Icos$\phi$,+Qcos$\phi$; +Qsin$\phi$, +Icos$\phi$; +Isin$\phi$,−Qsin$\phi$; +Qcos$\phi$,−Isin$\phi$; etc. It will be recognized that the sum of the samples in every other pair will produce one of the corrected samples $I_c$ or $Q_c$ as defined in equations (9) and (10). The sums of the samples in the intervening pairs are without meaning in the illustrated system and are therefore discarded. Adder 34 sums the signal samples $S_I$ and $S_K$ producing the signal $S_L$. In FIG. 3 the samples $S_L$ correspond to the sum of the temporally aligned samples $S_I$ and $S_K$ immediately above the respective $S_L$ sample. The periods designated X correspond to the meaningless sums. The signal $S_L$ is applied to latches 37 and 38 which are clocked by respective clock signals $\bar{\phi}_{3L}$ and $\phi_{3L}$ to demultiplex the desired I and Q samples producing the demodulated signals $S_N$ and $S_M$ respectively, corresponding to rotated signals $I_c$ and $Q_c$.

The angle by which the vectors are rotated is determined by the address codes applied to element 29. These address codes may be manually applied (element 26) to adjust the hue of the overall scene or applied, under control of an auto flesh detector (elements 12, 13, 14 and 18) to enhance flesh tones, or a combination of both as shown for illustrative purposes in FIG. 2. It is noted for completeness that when the chrominance angles for auto flesh enhancement are detected ahead of manual tint control, the system will not respond symmetrically for auto flesh correction since the auto flesh angles will be biased by the manual tint control angle.

Auto flesh angle detection will be described with reference to element 12 of FIG. 2, elements 13 and 14 being similar in construction. The $I_a$ ($S_A$) color mixture signal is applied to a first input port of subtractor element 50 and the sign bit (indicative of signal sample polarity) of the $I_a$ signal is applied to an inverting input terminal of AND gate 53. The $Q_a$ ($S_B$) signal is applied to element 52 which passes the absolute value $|Q_a|$ of the $Q_a$ samples. The output of element 52 is applied to a multiplier 51 which multiplies the $|Q_a|$ samples by a constant N. The multiplied $|Q_a|$ samples N$|Q_a|$ are applied to subtractor 50 which produces a signal corresponding to the polarity of the difference $I_a - N|Q_a|$ at its output terminal 54. The output terminal 54 of subtractor 50 is applied to a second input of AND gate 53 which produces a control signal on output connection 15 whenever the $I_a$ samples are positive and the polarity of the difference is negative. (The assumption is made that the samples are in two's complement form so that the sign bit is zero for positive values and one for negative values.

When the difference $I_a - N|Q_a|$ equals zero, $I_a/|Q_a|$ equals N and the angle of the chrominance signal (vector sum of $I_a$ and $Q_a$) relative to the Q axis is equal to the arctangent of N. If the difference is positive or negative the chrominance angle is lesser or greater than the arctan (N) respectively. The three angle detectors 12, 13 and 14 apply three difference multiplicative constants $N_i$. The control signals 15, 16 and 17 from the angle detectors are therefore indicative of different chrominance angle ranges. The control signals on connections 15, 16 and 17 are applied to element 18, for example a ROM, which generates address codes on its output connection 22 that may be applied directly to ROM 29 input connection 30 or through ADDER 29 wherein the auto flesh address codes are added to the manually generated tint control codes from element 26.

Element 18 produces address codes corresponding to angles by which the vectors $I_a$ and $Q_a$ are desired to be rotated depending upon the range of angles currently occupied by the chrominance vector. For example if the chrominance vector is between 20 and 30 degrees from the I vector the address codes may correspond to values to cause a rotation of 15 degrees. This occurs instantaneously whenever the chrominance vector enters this range.

Element 26 on the other hand produces angle address codes applicable to the chrominance vector for all angular positions of the chrominance vector. Element 26 is manually operated while the user is viewing the recovered scene to adjust the overall tint of the scene. Element 26 may be an up/down counter which when energized by the user, outputs binary address codes to rotate the chrominance vector in either direction until the scene contains a hue acceptable to the viewer. The codes from element 26 may be applied directly to ROM 29 (in the absence of auto flesh) or they may be added to the auto flesh address codes via ADDER 28.

Figure 4:
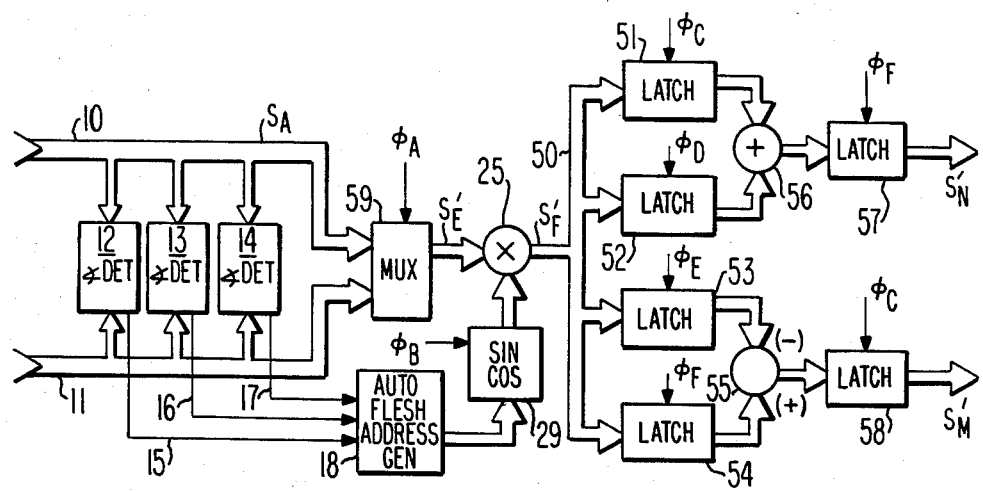
Figure 5:
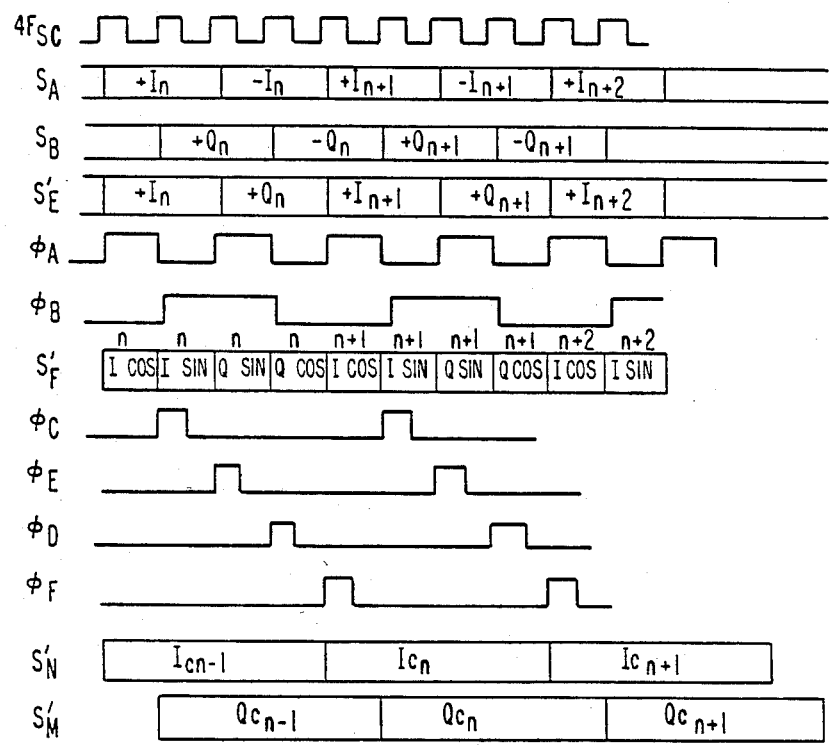

FIG. 4 is a variant of the FIG. 2 circuit. Elements having the same designation numbers as elements in FIG. 2 are equivalents. Description of the FIG. 4 circuit will be made with reference to the sample sequences and waveforms shown in FIG. 5. In FIG. 5 the $4F_{sc}$ waveform is the sampling clock used to perform analog-to-digital conversion of composite video. The remaining waveforms $\phi_A$, $\phi_B$, $\phi_C$, $\phi_E$, $\phi_D$ and $\phi_F$, are generated from the $4F_{sc}$ waveform using straight forward combinatorial logic as is known in the art of digital signal processing. The signal sequences $S_A$ and $S_B$ are the separated and demodulated I and Q color mixture signals as in FIG. 3. The subscripts n, n+1, n+2, etc. designate the subcarrier cycle from which the sample was digitized.

Signals $S_A$ and $S_B$ available on busses 10 and 11 are applied to multiplexer 59, which responsive to clock $\phi_A$, time division multiplexes the +I and +Q signals to form the sequence of signal $S'_E$. Signal $S'_E$ is applied to multiplier 25 wherein it is multiplied by the sine and cosine of the angle by which the vectors are to be rotated. The sines and cosines ar provided by element 29 which is energized by clock $\phi_B$ to produce the sequence of samples from multiplier 25 $I_n\cos\phi$, $I_n\sin\phi$, $Q_n\sin\phi$, $Q_n\cos\phi$, $I_{n+1}\cos\phi$, $I_{k+1}\sin\phi$ etc. These values are demultiplexed into latches 51, 52, 53 and 54 by clocks $\phi_C$, $\phi_D$, $\phi_E$ and $\phi_F$ respectively. The $I\cos\phi$ terms are successively latched in latch 51. The $Q\sin\phi$ terms are latched in latch 52, the $Q\cos\phi$ terms are latched in latch 53 and the $I\sin\phi$ terms are latched in latch 54. The $I\cos\phi$ and $Q\sin\phi$ terms are applied to ADDER 56 to produce the sum $I_c=I\cos\phi+Q\sin\phi$. The sums are successively latched into latch 57 by clock $\phi_F$ to produce the sequence $S'_N$.

The $Q\cos\phi$ and $I\sin\phi$ terms are applied to subtractor 55 which produces the difference $Q_c=Q\cos\phi-I\sin\phi$. The differences are successively latched into latch 58 by clock $\phi_c$ to produce the sequence $S'_M$.

Figure 6:
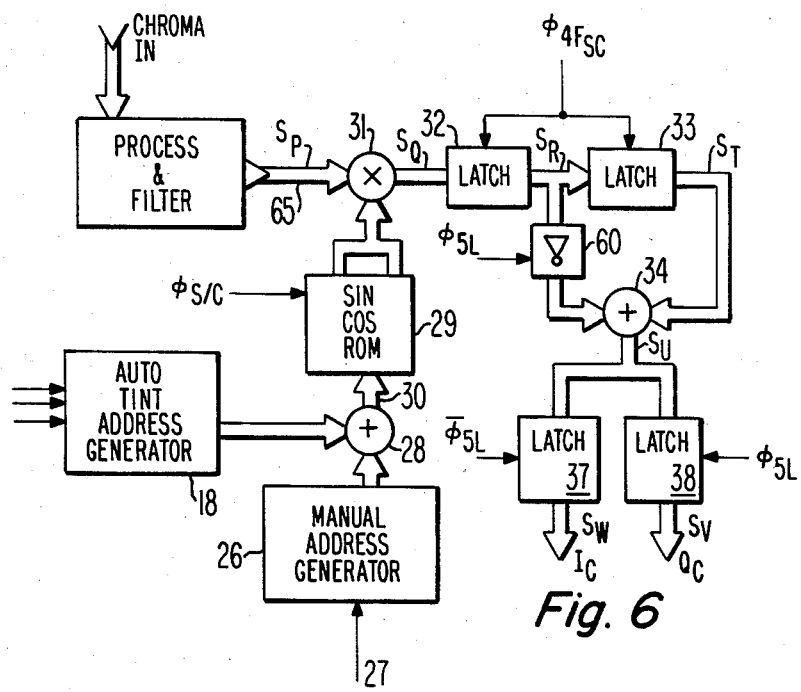
Figure 7:
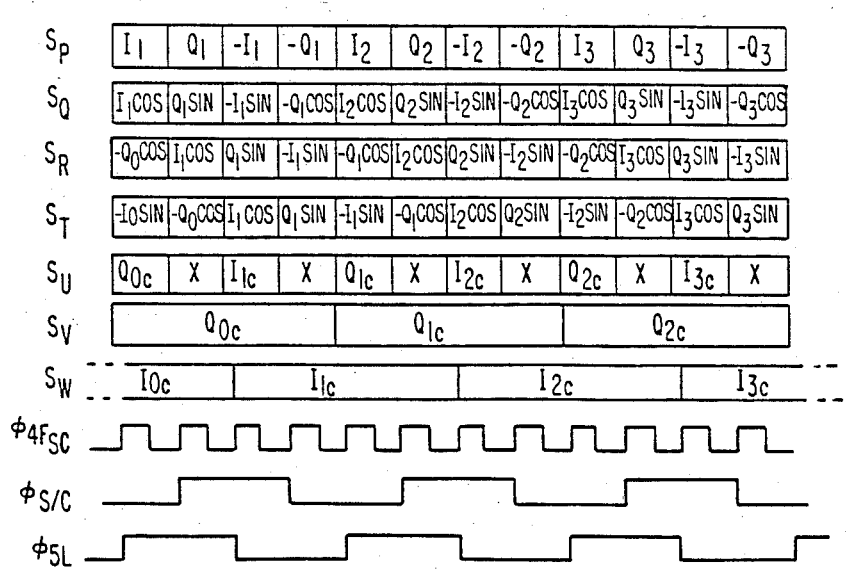

FIG. 6 is a further variation which operates directly on the non-demodulated chrominance signal. Operation of the FIG. 6 circuit will be described with reference to the signal sequences and waveforms illustrated in FIG. 7. When composite video is sampled at four times subcarrier along the I and Q axis and the chrominance signal is separated from luminance, the resulting chrominance sample sequence is in the form of signal $S_p$ in FIG. 7, i.e. $-Q_{n-1}, +I_n, Q_n, -I_n, -Q_n, +I_{n+1} \ldots$ In FIG. 6 the $S_p$ signal is applied to multiplier 31 wherein the samples are multiplied by the sines and cosines of the angle of rotation. The sine and cosine terms are provided by ROM 29 under the control of clock $\phi_{S/C}$ which provides the sine terms during the $+Q$ and $-I$ samples and cosine terms during the $-Q$ and $+I$ samples. The sequence of terms resulting from the multiplication is the signal $S_Q$. Signal $S_Q$ is applied to the serially connected latches 32 and 33 under control of clock $4F_{sc}$. Delayed signal sequences from latches 32 and 33 are denoted $S_R$ and $S_T$ respectively in FIG. 7.

Signal $S_R$ is applied to complementing circuit 60 which is controlled by clock $\phi_{5L}$ to complement the $-Q\cos\phi$ and $+I\cos\phi$ terms and to pass the $+Q\sin\phi$ and $-I\sin\phi$ terms unaltered. Signal from complementing circuit 60 and the $S_T$ signal are applied to the input ports of ADDER 34. ADDER 34 produces the sequences of sums $S_1=Q_o\cos\phi-I_o\sin\phi$; $S_2=I_1\cos\phi-Q_0\cos\phi$; $S_3=Q_1\sin\phi+I_1\cos\phi$; and $S_4=-I_1\sin\phi+Q_1\sin\phi$. Sums $S_1$ correspond to samples $Q_c$ and sums $S_3$ correspond to samples $I_c$ according to equations (9) and (10). Sums $S_2$ and $S_4$ are meaningless in the system and are discarded. Sums $S_1$ and $S_3$ are latched by clocks $\phi_{5L}$ and $\overline{\phi}_{5L}$ into latches 38 and 37 respectively to produce the signals $S_V$ and $S_W$ respectively.

The sequence $S_W$ of samples $I_c$ are generated from the $+I$ and $+Q$ signal samples of the sequence $S_p$. The sequence $S_V$ of samples $Q_c$ however are generated from the $-I$ and $-Q$ signal samples of the sequence $S_p$.

Three embodiments of the invention have been described for illustrative purposes. Armed with the foregoing disclosure one skilled in the art of digital signal processing may readily generate further variations without straying from the spirit of the invention. For example the multiplication function may be performed by generating the logarithm of the multiplicand and multiplier, adding the logs and applying the sums to an antilog table. Further the sine/cosine ROM may be implemented with a programmable logic array (PLA) etc.

What is claimed is:

1. In a television receiver including a source of quadrature sampled data PCM color mixture signals A1 and A2, apparatus for performing tint control by rotating the axes of the color mixture signals comprising:
   means for generating address codes corresponding to the angle by which said axes are to be rotated;
   means for generating clock signals in synchronism with the A1 and A2 signal samples;
   means including a multiplier circuit comprising a first input port coupled to said source for applying a sequence of alternating A1 and A2 samples, a second input port for applying a multiplier signal, and an output port;
   means responsive to said address codes and coupled to said clock signal generating means for alternately generating at an output port thereof, signals corresponding to the sine and cosine of the angle by which the axes are to be rotated;
   means for coupling said output port of the sine and cosine signal generating means to said second multiplier input port;
   delay means including an input port coupled to the multiplier circuit output port, and an output port; and
   means including an ADDER circuit coupled to said clock generating means and including first and second input ports respectively coupled to said input and output ports of said delay means, for sequentially producing the sums of successive output signals from said multiplier circuit means.

2. The apparatus set forth in claim 1 wherein one of said ADDER first and second input ports is coupled to one of the input and output ports of the delay means by a signal polarity inverting means.

3. The apparatus set forth in claim 1 wherein the source of signals A1 and A2 produces separate demodulated A1 and A2 signals and the multiplier circuit input port is coupled to the source by a multiplexer which time division multiplexes selected ones of the A1 signal samples with selected ones of the A2 signal samples to form an alternating sequence of A1 and A2 signal samples.

4. The apparatus set forth in claim 3 wherein the multiplexer includes first and second latch circuits respectively coupled to delay the A1 and A2 signals and wherein the multiplexer multiplexes the A1 and A2 signals in the sequence of a nondelayed A1 sample, a nondelayed A2 sample, a delayed A1 sample and a delayed A2 sample so that each of the selected A1 samples A1$_i$ and each of the selected A2 samples A2$_i$ occurs twice in the multiplexed signal in the sequence A1$_1$, A2$_i$, A1$_i$, A2$_i$, A1$_{i+1}$, A2$_{i+1}$, A1$_{i+1}$, A2$_{i+1}$, etc.

5. The apparatus set forth in claim 1 wherein said adder circuit means further includes first and second latch circuits coupled to said output of said adder circuit for alternately demultiplexing selected ones of said sums.

6. The apparatus set forth in claim 1 wherein said means for generating signals corresponding to the sines and cosines of the rotation angle comprises a ROM programmed to produce at an output port thereof, PCM signals corresponding to the sine and cosine of said address codes applied at an input port thereof.

7. The apparatus set forth in claim 6 wherein said means for generating address codes is responsive to manual stimulus for producing substantially constant address codes continually applicable to the A1 and A2 signals.

8. The apparatus set forth in claim 1 wherein said means for generating address codes is responsive to said signals A1 and A2 and produces address codes only for preselected ranges of the ratio of the magnitude of A1 to the magnitude of A2 thereby selectively rotating the A1 and A2 signal axis for predetermined signal conditions.

9. The apparatus set forth in claim 1 wherein said source of signals A1 and A2 produces a sequence of nondemodulated A1 and A2 signals occurring in sequences $+A1, +A2, -A1, -A2$, and wherein the multiplier is coupled directly to said source.

10. Apparatus in a TV signal processing system for performing tint correction by rotating the axes of quadrature related color mixture signals A1 and A2, by selected angles comprising:

a source for providing respective sampled data PCM quadrature color mixture signals A1 and A2;

clock generating means for generating a plurality of timing signals occurring synchronously with said A1 and A2 samples;

a multiplexer responsive to said clock generating means for multiplexing selected ones of said A1 signal samples with selected ones of said A2 signal samples;

address code generating means for producing address codes corresponding to angles by which said axes may be rotated;

sine/cosine generating means responsive to said address codes and said clock generating means for alternately producing at an output port thereof, signals corresponding to the sine and the cosine of the applied address code;

a multiplier responsive to the sample sequence from said multiplexer and to the sine/cosine generating means for multiplying the multiplexed A1 signal samples by the sine and cosine terms and multiplying the multiplexed A2 signal samples by the sine and cosine terms;

first, second, third and fourth latches responsive to the clock generating means for respectively demultiplexing the A1 x cosine, A2 x sine, A1 x sine and A2 x cosine terms produced by the multiplier;

an ADDER circuit coupled to the first and second latches for successively producing sums equal to $A1\cos\phi + A2\sin\phi$ where $\phi$ is the angle of rotation; and a subtractor circuit coupled to the third and fourth latches for successively producing differences equal to $A2\cos\phi - A1\sin\phi$.

11. The apparatus set forth in claim 10 wherein the address code generating means is responsive to the A and A2 signals from said source to generate preselected address codes corresponding to preselected angles $\phi$ for preselected range of the ratio of the magnitude of signal A to the magnitude of signal A2.

12. In a TV signal processing system including a source of PCM sampled data A1 color mixture signals and quadrature related A2 color mixture signals, a method for controllng the hue manifested by the vector sum of the A1 and A2 signals by rotating the axes of the A1 and A2 signals by an angle $\phi$, comprising:

multiplexing selected ones of the A1 signal samples with selected ones of the A2 signal samples to produce an alternating sequence of A1 and A2 signal samples;

multiplying selected ones of the multiplexed A1 and A2 signal samples by the cosine of angle $\phi$ and multiplying the other multiplexed A1 and A2 signal samples by the sine of angle $\phi$;

delaying the multiplied signal sequence by one sample period;

summing and differencing selected pairs of delayed and nondelayed signal samples;

demultiplexing selected ones of said sums to form a first modified color mixture signal, $A1'$ and demultiplexing selected ones of said differences to form a second modified color mixture signal $A2'$ wherein the $A1'$ and $A2'$ color mixture signals respectively correspond to the A1 and A2 color mixture signals rotated by the angle $\phi$.

13. In a TV signal processing system including a source of interleaved quadrature related PCM color mixture signals A1 and A2, a method for modifying the hue manifested by the vector sum of the color mixture signals A1 and A2 by rotating the axes of the A1 and A2 signals by an angle $\phi$, comprising:

multiplying every other pair of interleaved A1 and A2 samples by the sine of the rotation angle $\phi$, and multiplying the intervening pairs of A1 and A2 samples by the cosine of the angle $\phi$;

successively delaying the multiplied samples by one sample period;

forming the sums of the delayed $A1\cos\phi$ terms with nondelayed $A2\sin\phi$ terms; and forming the differences $A2\cos\phi - A1\sin\phi$ of the nondelayed $A2\cos\phi$ terms with delayed $A1\sin\phi$ terms.

14. In a television receiver including a source of quadrature, sampled data, PCM color mixture signals A1 and A2, apparatus for performing hue correction by rotating the axes of the color mixture signals comprising:

means responsive to the A1 and A2 signals for generating samples corresponding to the instantaneous ratio of their magnitudes;

means responsive to said samples corresponding to the instantaneous ratios for generating coefficients corresponding to the sines and cosines of angles of desired axes rotation for the angle defined by the arctangent of said instantaneous ratio;

means responsive to the A1 and A2 signals and the coefficients corresponding to sines and cosines for producing products of the coefficients times the A1 and A2 signals; and means including an adder for algebraically combining the products into sums of signal A1 samples times the sine coefficients and the A2 samples times the cosine coefficients and the sums of A1 samples times the cosine coefficients and the A2 samples times the sine coefficients.

* * * * *

UNITED STATES PATENT AND TRADEMARK OFFICE
CERTIFICATE OF CORRECTION

PATENT NO. : 4,554,576

DATED : Nov. 19, 1985

INVENTOR(S) : Yih-Sien Kao

It is certified that error appears in the above-identified patent and that said Letters Patent is hereby corrected as shown below:

| | |
|---|---|
| Column 3, line 51 | between "$\alpha$" and "the" insert --is--. |
| Column 4, line 2 | "(100)" should be --(10)--. |
| Column 7, line 25 | "$Q_n$," should be --+$Q_n$,--. |
| Column 7, line 43 | "$S_2 - I_1 \cos\phi - Q-$" should be --$S_2 = -I_1 \cos\phi - Q-$ --. |
| Column 8, line 49 | "$Al_1$" should be --$Al_i$--. |

Signed and Sealed this

Thirteenth Day of May 1986

[SEAL]

Attest:

DONALD J. QUIGG

*Attesting Officer*     *Commissioner of Patents and Trademarks*